US010784735B2

(12) United States Patent
Kim et al.

(10) Patent No.: US 10,784,735 B2
(45) Date of Patent: Sep. 22, 2020

(54) ROTOR AND GENERATOR INCLUDING THE SAME

(71) Applicant: DOOSAN HEAVY INDUSTRIES & CONSTRUCTION CO., LTD., Changwon-si, Gyeongsangnam-do (KR)

(72) Inventors: Sung Ha Kim, Changwon-si (KR); Kye Ha Hwang, Changwon-si (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 119 days.

(21) Appl. No.: 16/100,215

(22) Filed: Aug. 10, 2018

(65) Prior Publication Data

US 2019/0074743 A1 Mar. 7, 2019

(30) Foreign Application Priority Data

Sep. 5, 2017 (KR) .................. 10-2017-0113120

(51) Int. Cl.
*H02K 9/18* (2006.01)
*H02K 3/24* (2006.01)
(Continued)

(52) U.S. Cl.
CPC ............. *H02K 3/24* (2013.01); *H02K 1/32* (2013.01); *H02K 9/10* (2013.01); *H02K 9/18* (2013.01);
(Continued)

(58) Field of Classification Search
CPC .. H02K 1/32; H02K 1/51; H02K 3/00; H02K 3/24; H02K 9/00; H02K 9/06; H02K 9/08; H02K 9/10; H02K 9/18
See application file for complete search history.

(56) References Cited

U.S. PATENT DOCUMENTS 4,155,019 A * 5/1979 Weghaupt .............. H02K 55/04
310/61
6,952,070 B1 10/2005 Kaminski et al.
(Continued)

FOREIGN PATENT DOCUMENTS

| JP | 2003-250238 A | 9/2003 |
| JP | 2006-081367 A | 3/2006 |
| KR | 10-2006-0047565 A | 5/2006 |

OTHER PUBLICATIONS

Korean Office Action issued by the Korean Intellectual Property Office dated May 9, 2018 in connection with Korean Patent Application No. 10-2017-0113120.
(Continued)

*Primary Examiner* — Tran N Nguyen
(74) *Attorney, Agent, or Firm* — Invenstone Patent, LLC (57) ABSTRACT

A rotor and a generator including the same are capable of reducing a pressure loss of a cooling fluid, of increasing a flow rate of a cooling fluid flowing to a rotor coil, and of having improved cooling performance. The rotor includes a rotor shaft; a rotor coil wound around the rotor shaft; a rotor coil protection ring surrounding the rotor coil at one end of the rotor shaft and being spaced apart from the rotor shaft to form a clearance space between the rotor coil protection ring and the rotor shaft; and a fan coupled to the rotor shaft opposite the rotor coil, interposing the rotor coil protection ring, to blow a cooling fluid toward the rotor coil, at least part of the blown cooling fluid flowing to the rotor coil being guided through the clearance space by surfaces of the rotor coil protection ring.

18 Claims, 7 Drawing Sheets

(51) Int. Cl.
*H02K 9/10* (2006.01)
*H02K 1/32* (2006.01)
H02K 3/51 (2006.01)
H02K 5/20 (2006.01)
H02K 7/14 (2006.01)

(52) U.S. Cl.
CPC ............... *H02K 3/51* (2013.01); *H02K 5/20* (2013.01); *H02K 7/14* (2013.01)

(56) References Cited

U.S. PATENT DOCUMENTS

| | | | | |
|---|---|---|---|---|
| 8,203,249 | B1* | 6/2012 | Rao | H02K 3/42 |
| | | | | 310/256 |
| 8,629,589 | B2* | 1/2014 | Neje | H02K 1/32 |
| | | | | 310/270 |

OTHER PUBLICATIONS

English translation of a Korean Office Action dated May 9, 2018 in connection with Korean Patent Application No. 10-2017-0113120.

* cited by examiner

Related Art

ROTOR AND GENERATOR INCLUDING THE SAME

CROSS-REFERENCE TO RELATED APPLICATIONS

This application claims priority to Korean Patent Application No(s). 10-2017-0113120, filed on Sep. 5, 2017, the disclosure of which is incorporated herein by reference in its entirety.

BACKGROUND OF THE INVENTION

Field of the Invention

Exemplary embodiments of the present disclosure relate to a rotor and a generator including the same, and more particularly, to a rotor capable of being cooled by means of a cooling fluid, and a generator including the same.

Description of the Related Art

In general, a generator is a device that converts mechanical energy into electrical energy by electromagnetic induction action and uses the principle of generating electric power when a conductor rotates in a magnetic field. Such a generator is typically provided with cooling means using a cooling fluid, such as hydrogen gas or water, in order to prevent the deterioration of generator components from the high temperatures associated with power generation.

Figure 1:
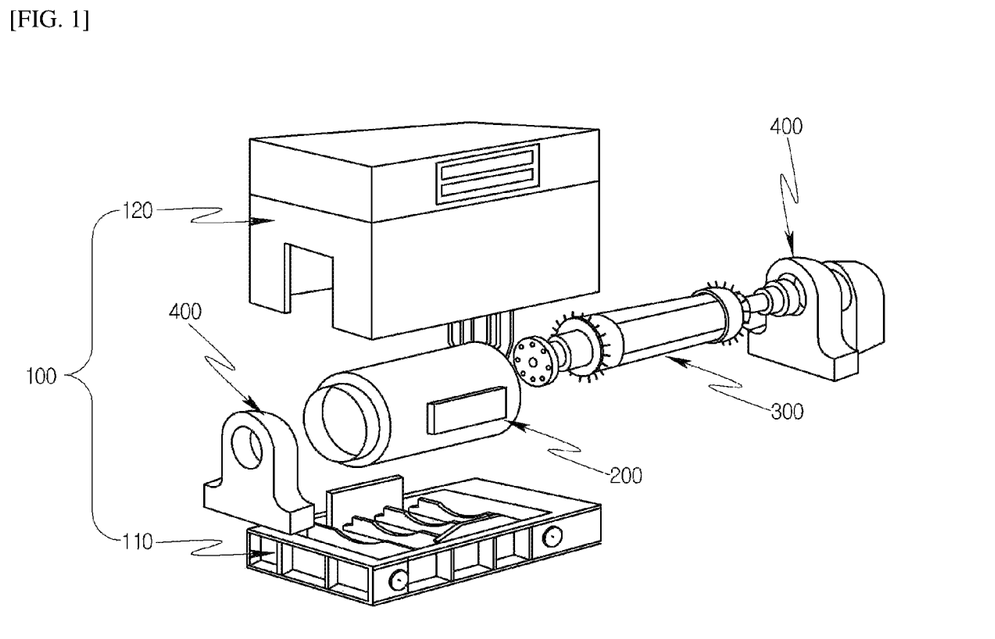
FIG. 1 is an exploded perspective view of a typical generator.
Figure 2:
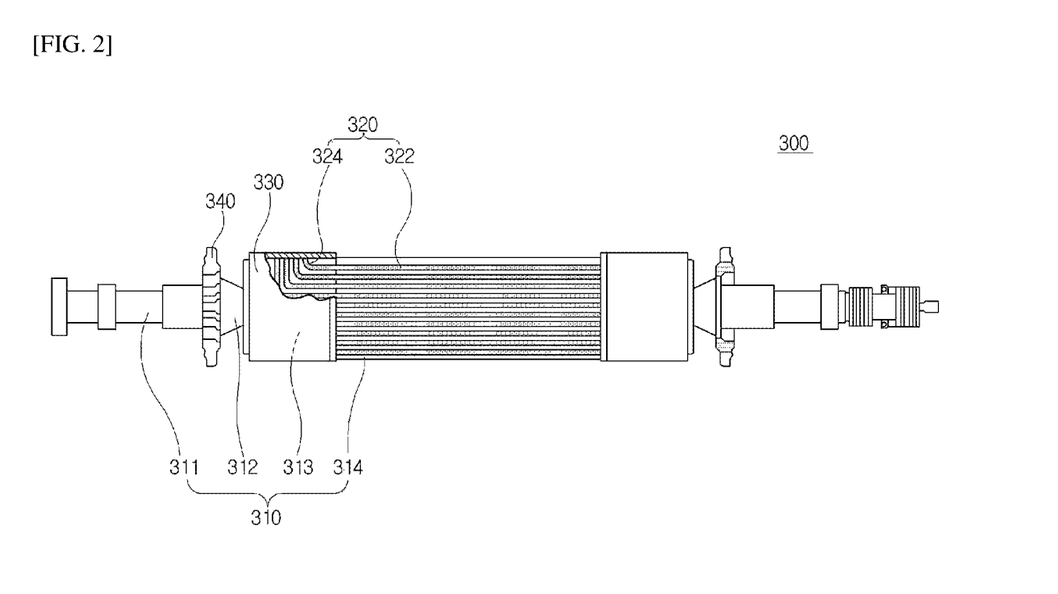
FIG. 2 is a top view of a typical rotor applied to the generator of FIG. 1.
Figure 3:
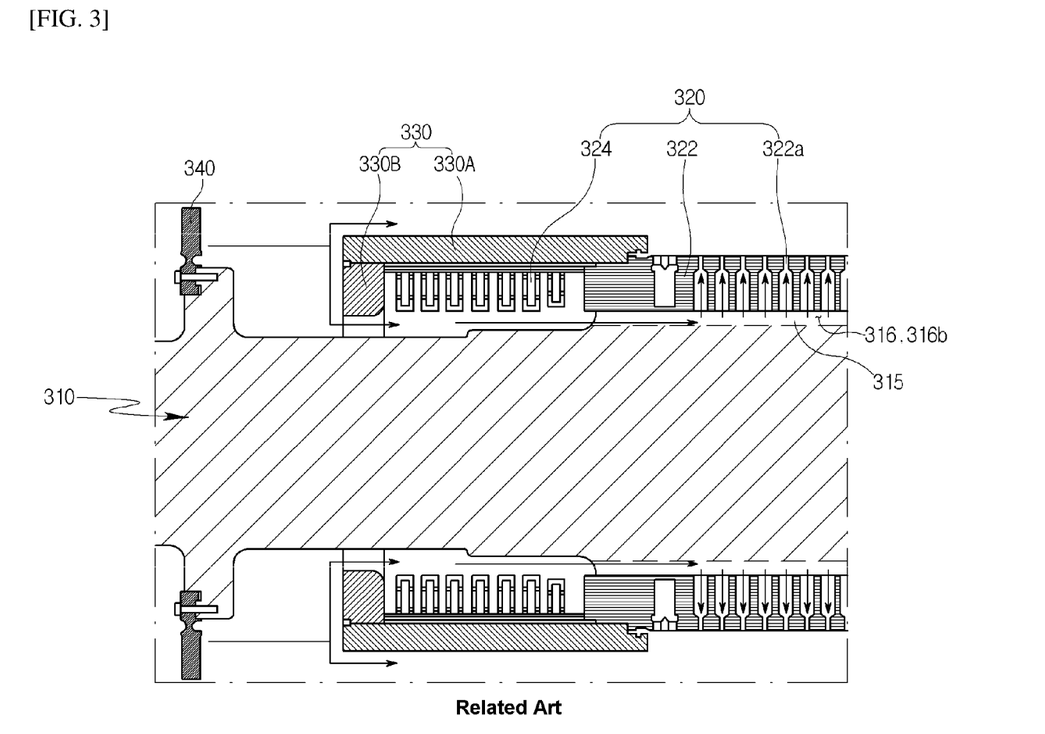
FIG. 3 is a cutaway cross-sectional view of a contemporary rotor.

FIG. 1 illustrates a typical generator in which a rotor as shown in FIG. 2 may be applied. FIG. 3 shows a contemporary rotor.

Referring to FIGS. 1 to 3, a generator may include a stator 200 that is fixedly installed in a housing 100, and a rotor 300 that is accommodated and rotatably installed in the stator 200.

The rotor 300 includes a rotor shaft 310 on which the rotor 30 rotates; a rotor coil 320 wound around the rotor shaft 310; a rotor coil protection ring 330 that surrounds the rotor coil 320 at one end of the rotor shaft 310; and a fan 340 that is coupled to the rotor shaft 310 opposite the rotor coil 320, interposing the rotor coil protection ring 330, to blow a cooling fluid toward the rotor coil 320.

In the contemporary rotor 300 having the above configuration and the generator including the same, the torque of the rotor 300 is converted into electrical energy by interaction between the rotor 300 and the stator 200. In this process, the fan 340 is rotated together with the rotor 300 and blows the cooling fluid, which flows to the rotor coil 320 through a clearance space between the rotor coil protection ring 330 and the rotor shaft 310 to cool the rotor coil 320.

However, in the contemporary rotor 300 and the generator including the same, the rotor coil protection ring 330 interrupts the flow of the cooling fluid blown from the fan 340, resulting in an increase in the pressure loss of the cooling fluid and a reduction in the flow rate of the cooling fluid flowing to the rotor coil 320 through the clearance space between the rotor coil protection ring 330 and the rotor shaft 310. Hence, there is a problem in that the cooling performance of the rotor is degraded.

SUMMARY OF THE INVENTION

An object of the present disclosure is to provide a rotor capable of reducing a pressure loss of a cooling fluid, of increasing a flow rate of a cooling fluid flowing to a rotor coil, and of having improved cooling performance, and a generator including the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a rotor may include a rotor shaft; a rotor coil wound around the rotor shaft; a rotor coil protection ring surrounding the rotor coil at one end of the rotor shaft and being spaced apart from the rotor shaft to form a clearance space between the rotor coil protection ring and the rotor shaft; and a fan coupled to the rotor shaft opposite the rotor coil, interposing the rotor coil protection ring, to blow a cooling fluid toward the rotor coil, at least part of the blown cooling fluid flowing to the rotor coil being guided through the clearance space by surfaces of the rotor coil protection ring.

The surfaces of the rotor coil protection ring may include an inner peripheral surface facing the rotor shaft; an outer peripheral surface forming a back of the inner peripheral surface; and a tip surface extending between the inner and outer peripheral surfaces to face the fan and including a first redirecting surface for redirecting the flow of the blown cooling fluid to the clearance space.

The first redirecting surface may extend an entire length of the tip surface.

The blown cooling fluid may flow in an axial direction of the rotor shaft, and the first redirecting surface may be inclined with respect to the axial direction of the rotor shaft.

The first redirecting surface may be formed such that a distance ($D12$) to the rotor shaft in a radial direction of the rotor shaft is decreased as a distance ($D11$) to the fan in the axial direction of the rotor shaft is increased. The distance ($D12$) to the rotor shaft in the radial direction of the rotor shaft may decease at a constant rate or at a reducing rate.

The surfaces of the rotor coil protection ring may further include a second redirecting surface for redirecting the flow of the blown cooling fluid to the outer peripheral surface.

The blown cooling fluid may flow in an axial direction of the rotor shaft, and the second redirecting surface may be inclined with respect to the axial direction of the rotor shaft.

The second redirecting surface may be formed such that a distance ($D22$) to the rotor shaft in a radial direction of the rotor shaft is increased as a distance ($D21$) to the fan in the axial direction of the rotor shaft is increased. The distance ($D22$) to the rotor shaft in the radial direction of the rotor shaft may increase at a constant rate or at a reducing rate.

The rotor coil protection ring may include a retaining ring positioned opposite the rotor shaft interposing the rotor coil, the retaining ring having a surface that faces the fan and includes the first redirecting surface; and a centering ring positioned between the rotor coil and the fan, the centering ring protruding from the retaining ring toward the rotor shaft and having a surface that faces the fan and includes the second redirecting surface.

The rotor coil protection ring may include a retaining ring positioned opposite the rotor shaft interposing the rotor coil; a centering ring positioned between the rotor coil and the fan, the centering ring protruding from the retaining ring toward the rotor shaft; and a guide member fastened to at least one of the retaining ring and the centering ring to be interposed between the retaining ring and the fan and between the centering ring and the fan, the guide member having a surface that faces the fan and includes the first and second redirecting surfaces.

In accordance with another aspect of the present disclosure, a rotor may include a rotor shaft; a rotor coil wound around the rotor shaft; a rotor coil protection ring surrounding the rotor coil at one end of the rotor shaft; a fan coupled to the rotor shaft opposite the rotor coil, interposing the rotor coil protection ring, to blow a cooling fluid toward the rotor coil; and redirecting surfaces formed on the rotor coil protection ring so as to face the fan, at least a portion of the redirecting surfaces being formed such that a distance (D12) to the rotor shaft in a radial direction of the rotor shaft is decreased as a distance (D11) to the fan in an axial direction of the rotor shaft is increased.

The rotor coil protection ring may include a retaining ring positioned opposite the rotor shaft interposing the rotor coil; and a centering ring positioned between the rotor coil and the fan, the centering ring protruding from the retaining ring toward the rotor shaft and having a surface that faces the fan and is formed such that a distance (D12) to the rotor shaft in the radial direction of the rotor shaft is decreased as a distance (D11) to the fan in the axial direction of the rotor shaft is increased.

The retaining ring may have a surface that faces the fan and is formed such that a distance (D12) to the rotor shaft in the radial direction of the rotor shaft is decreased as a distance (D11) to the fan in the axial direction of the rotor shaft is increased.

The retaining ring may have a surface that faces the fan and is formed such that a distance (D22) to the rotor shaft in the radial direction of the rotor shaft is increased as a distance (D21) to the fan in the axial direction of the rotor shaft is increased.

The rotor coil protection ring may include a retaining ring positioned opposite the rotor shaft interposing the rotor coil; a centering ring positioned between the rotor coil and the fan, the centering ring protruding from the retaining ring toward the rotor shaft; and a guide member fastened to at least one of the retaining ring and the centering ring to be interposed between the retaining ring and the fan and between the centering ring and the fan, the guide member having redirecting surfaces that face the fan and comprise an inner peripheral portion (336a) positioned inward in the radial direction of the rotor shaft and an outer peripheral portion (336b) positioned outward in the radial direction of the rotor shaft. The inner peripheral portion may be formed such that a distance (D12) to the rotor shaft in the radial direction of the rotor shaft is decreased as a distance (D11) to the fan in the axial direction of the rotor shaft is increased, and the outer peripheral portion is formed such that a distance (D22) to the rotor shaft in the radial direction of the rotor shaft is increased as a distance (D21) to the fan in the axial direction of the rotor shaft is increased.

In accordance with another aspect of the present disclosure, a generator may include a housing; a stator fixedly installed the housing; and the above rotor being accommodated and rotatably installed in the stator.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Reference will now be made in detail to exemplary embodiments of the present disclosure, examples of which are illustrated in the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Hereinafter, a rotor and a generator including the same according to exemplary embodiments of the present disclosure will be described in detail with reference to the accompanying drawings.

Figure 4:
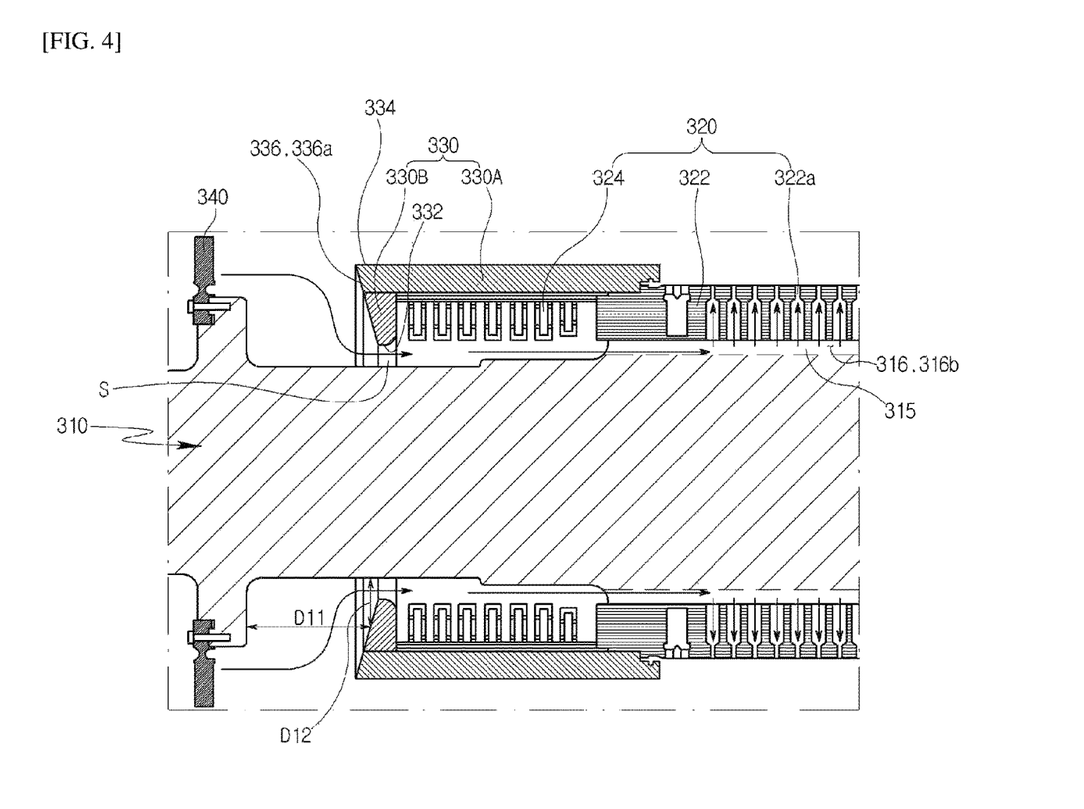
FIG. 4 is a cross-sectional view of a rotor according to an embodiment of the present disclosure.

FIG. 1 illustrates a typical generator. FIG. 4 illustrates a rotor in a generator according to an embodiment of the present disclosure.

Referring to FIGS. 1 and 4, the generator according to the embodiment of the present disclosure may include a housing 100, a stator 200 that is fixedly installed in the housing 100, a rotor 300 that is accommodated and rotatably installed in the stator 200, and a bearing 400 that rotatably supports the rotor 300.

The housing 100 may include a frame 110 that supports the stator 200, and a cover 120 that covers the frame 110.

Here, the housing 100 may have a closed structure to fill the housing 100 with a cooling fluid (e.g., hydrogen gas or water), to prevent the cooling fluid from leaking out of the housing 100, and to prevent introduction of foreign substances into the housing 100 from the outside.

The stator 200 may includes a stator core that provides a magnetic flux path, and a stator coil that is wound around the stator core.

The stator 200 may further include a stator refrigerant passage through which a cooling fluid passes to cool the stator 200.

The rotor 300 may include a rotor shaft 310 on which the rotor 300 is rotatably provided, a rotor coil 320 that is wound around the rotor shaft 310, a rotor coil protection ring 330 that surrounds the rotor coil 320 at the end of the rotor shaft 310, and a fan 340 that is coupled to the rotor shaft 310 opposite the rotor coil 320 interposing the rotor coil protection ring 330 to blow a cooling fluid to the rotor coil 320.

The rotor shaft 310 may include a bearing support portion 311 that extends in one direction and is supported by the bearing 400, a fan installation portion 312 to which the fan 340 is installed, a ring position portion 313 at which the rotor coil protection ring 330 is positioned, and a rotor body 314 that supports the rotor coil 320. The bearing support portion 311, the fan installation portion 312, and the rotor body 314 may be arranged in sequential order in the axial direction of the rotor shaft 310.

Among these, the rotor body 314 may includes a tooth 315 that protrudes outward in the radial direction of the rotor shaft 310, and a slot 316 that is recessed inward in the radial direction of the rotor shaft 310 by the tooth 315.

In detail, the tooth 315 may protrude in the radial direction of the rotor shaft 310 from the outer peripheral surface of the rotor shaft 310 and extend in the axial direction of the rotor shaft 310.

The tooth 315 may consist of a plurality of teeth arranged radially in the circumferential direction of the rotor shaft 310.

Thus, a plurality of slots 316 may be formed between the respective teeth 315, and each of the slots 316 may extend in the axial direction of the rotor shaft 310.

The teeth 315 and the slots 316 may support the rotor coil 320 and form a refrigerant passage through which a cooling fluid passes.

That is, the rotor coil 320 includes a rectilinear portion 322 to be described later, and the rectilinear portion 322 may be inserted into the upper portion (a portion outward in the radial direction of the rotor shaft 310) of each slot 316 to be supported by two adjacent teeth 315.

Since the rectilinear portion 322 is inserted into only the upper portion of the slot 316, the lower portion (a portion inward in the radial direction of the rotor shaft 310) of each slot 316 may be defined as a space.

Here, the lower space of the slot 316 is typically referred to as a sub-slot 316b, and the sub-slot 316b may be open toward the fan 340 so that the cooling fluid blown from the fan 340 is introduced into the sub-slot 316b.

The rotor coil 320 may have a plurality of conductors laminated in a multistage manner, each serving as a path in which a current flows to magnetize the rotor shaft 310. The rotor coil 320 may include a rectilinear portion 322 that extends in the axial direction of the rotor shaft 310 and is inserted into the upper portion of the slot 316, and a curved portion 324 that extends in the circumferential direction of the rotor shaft 310 from the rectilinear portion 322 and is covered by the rotor coil protection ring 330.

Here, the rectilinear portion 322 may include a duct 322a that allows the gap between the stator 200 and the rotor 300 to communicate with the sub-slot 316b, and the duct 322a may pass through the rectilinear portion 322 in the radial direction of the rotor shaft 310. The duct 322a may consist of a plurality of ducts arranged in the extension direction of the sub-slot 316b.

The rotor coil protection ring 330 is formed to cover the curved portion 324 of the rotor coil 320 in the ring position portion 313 to prevent separation of the rotor coil 320 from the rotor shaft 310 by centrifugal force. The rotor coil protection ring 330 may include a retaining ring 330A that is positioned opposite the rotor shaft 310 with the curved portion 324 of the rotor coil 320 disposed therebetween, and a centering ring 330B that protrudes toward the rotor shaft 310 from the retaining ring 330A while being positioned between the curved portion 324 of the rotor coil 320 and the fan 340.

Here, the rotor coil protection ring 330 may be spaced apart from the rotor shaft 310 such that the cooling fluid blown from the fan 340 is able to flow to the sub-slot 316b.

The fan 340 may be formed to blow a cooling fluid in the axial direction of the rotor shaft 310.

In the rotor 300 having the above configuration and the generator including the same, the rotor 300 rotates in the state in which a current flows in the rotor coil 320, and a current may be generated in the stator coil by interaction between the rotor 300 and the stator 200. That is, the torque of the rotor 300 may be converted into electrical energy.

In this process, since the fan 340 rotated together with the rotor 300 blows a cooling fluid to cool a portion such as the rotor coil 320, for example, even though the portion generates heat, it is possible to prevent deterioration due to generation of heat.

In detail, the cooling fluid blown by the fan 340 is introduced into the sub-slot 316b through a clearance space S between the rotor coil protection ring 330 and the rotor shaft 310, and is then discharged to the gap between the stator 200 and the rotor 300 through the duct 322a, thereby enabling the rotor coil 320 to be cooled.

To enhance cooling performance and power generation efficiency in the rotor 300 and the generator including the same according to the embodiment of the present disclosure, the rotor coil protection ring 330 may be formed to guide the cooling fluid blown from the fan 340 to the clearance space S between the rotor coil protection ring 330 and the rotor shaft 310.

In detail, the rotor coil protection ring 330 may include an inner peripheral surface 332 that faces the outer peripheral surface of the rotor shaft 310, an outer peripheral surface 334 that forms the back of the inner peripheral surface 332, and a tip surface 336 that extends from the inner peripheral surface 332 to the outer peripheral surface 334 and faces the fan 340. The tip surface 336 may include a first redirecting surface 336a that redirects the flow of the cooling fluid blown from the fan 340 to the clearance space S.

In the present embodiment, the tip surface 336 may be formed such that its entire length consists of the first redirecting surface 336a, to maximize the flow rate of a cooling fluid guided to the clearance space S in the cooling fluid blown from the fan 340. In other words, the first redirecting surface 336a may extend the entire length of the tip surface 336. On the other hand, the tip surface 336 may be formed such that only a portion of it constitutes the first redirecting surface 336a, which will be described later.

The first redirecting surface 336a may be inclined with respect to the axial direction of the rotor shaft 310. That is, the first redirecting surface 336a may be formed such that a distance D12 to the rotor shaft 310 in the radial direction of the rotor shaft 310 is decreased as a distance D11 to the fan 340 in the axial direction of the rotor shaft 310 is increased. Through such a structure, the cooling fluid, which flows from the fan 340 to the tip surface 336 in the axial direction of the rotor shaft 310, may be obliquely redirected by the first redirecting surface 336a so that a significant amount of the cooling fluid is guided to the clearance space S.

Thus, since the rotor coil protection ring 330 does not interrupt the flow of the cooling fluid blown from the fan 340, it is possible to reduce a pressure loss of a cooling fluid. In addition, it is possible to enhance cooling performance since the flow rate of the cooling fluid flowing to the sub-slot 316b through the clearance space S is increased.

In addition, the cooling fluid, which flows from the fan 340 to the tip surface 336 in the axial direction of the rotor shaft 310, may not be redirected in a direction perpendicular to the axial direction of the rotor shaft 310. Thus, it is possible to reduce an impulse between the cooling fluid and the rotor coil protection ring 330.

Figure 5:
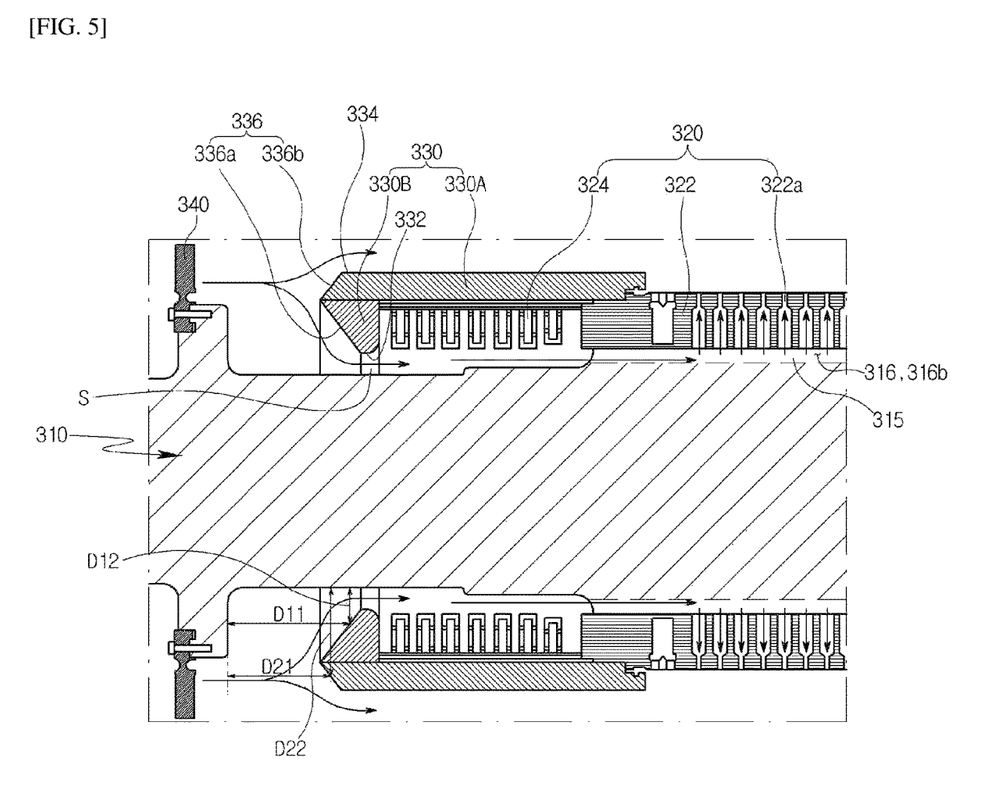
FIGS. 5 to 7 are cross-sectional views of rotors according to other embodiments of the present disclosure, respectively.
Figure 6:
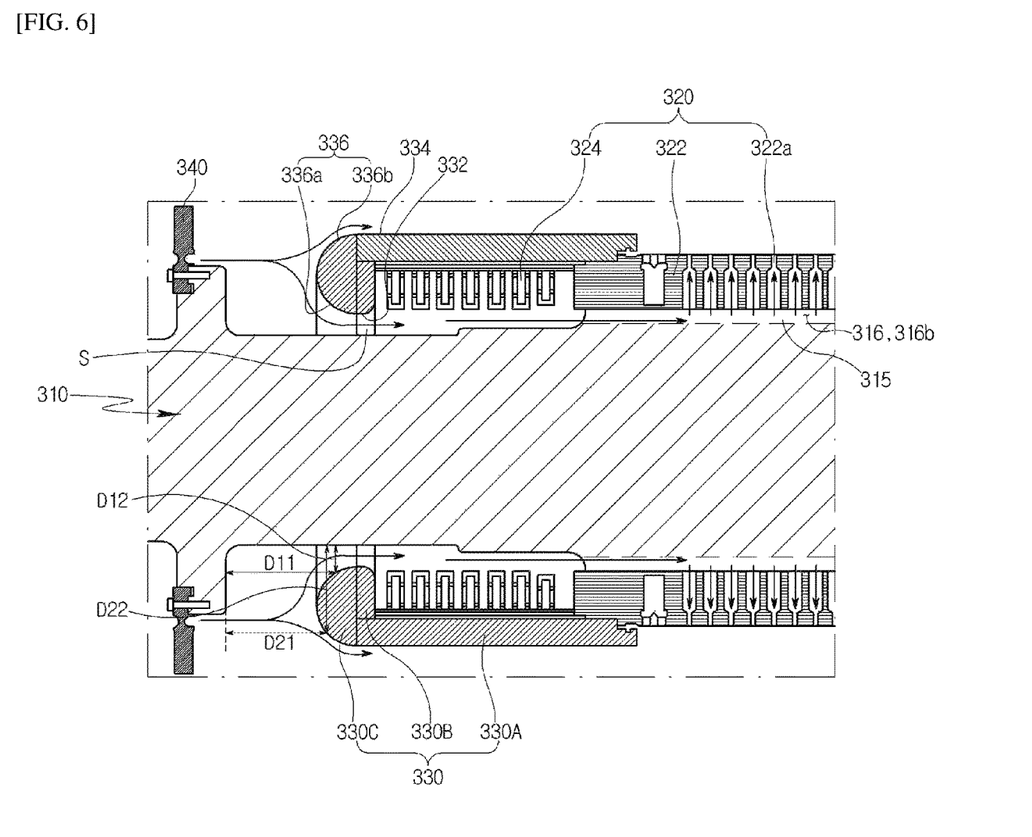
Figure 7:
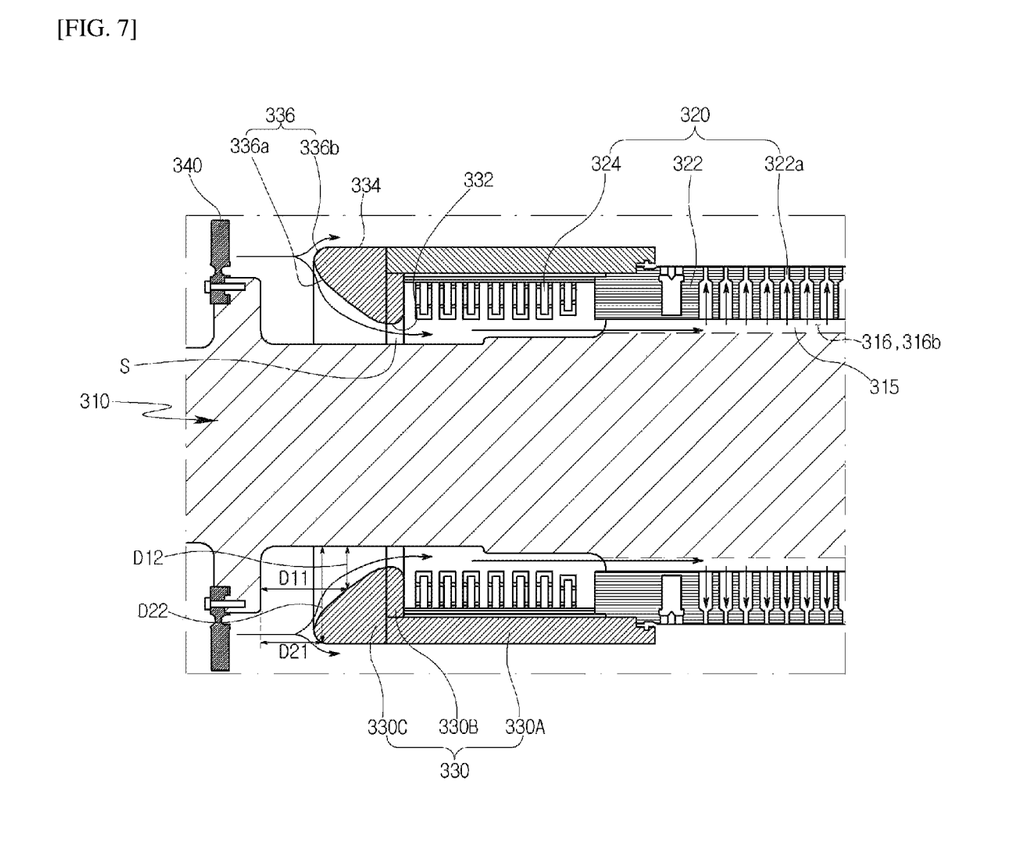

Although the entirety of the tip surface 336 is formed of the first redirecting surface 336a in the present embodiment, only a portion of the tip surface 336 may be formed of the first redirecting surface 336a as illustrated in one of FIGS. 5 to 7.

That is, the rotor coil protection ring 330 may further include a second redirecting surface 336b that redirects the flow of the cooling fluid blown from the fan 340 to the outer peripheral surface 334.

Here, the second redirecting surface 336b may be inclined with respect to the axial direction of the rotor shaft 310, similar to the first redirecting surface 336a, to reduce an impulse between the cooling fluid and the rotor coil protection ring 330. That is, the second redirecting surface 336b may be formed such that a distance D22 to the rotor shaft 310 in the radial direction of the rotor shaft 310 is increased as a distance D21 to the fan 340 in the axial direction of the rotor shaft 310 is increased.

In this case, since the separation of the cooling fluid from the rotor coil protection ring 330 is further suppressed when the cooling fluid flows through the rotor coil protection ring 330, it is possible to further reduce a pressure loss.

However, a cooling effect may be reduced since the flow rate of the cooling fluid guided to the clearance space S is reduced. In addition, a cooling effect may be reduced since the cooling fluid redirected to the outer peripheral surface 334 by the second redirecting surface 336b interrupts the discharge of cooling fluid from the duct 322a to the gap between the stator 200 and the rotor 300.

However, as illustrated in FIGS. 5 and 7, when a boundary between the first and second redirecting surfaces 336a and 336b is nearer the outer peripheral surface 334 than the inner peripheral surface 332, it is possible to suppress separation of a cooling fluid and minimize a reduction in cooling effect.

Although a rate of decrease ΔD12/ΔD11 in the distance D12 from the first redirecting surface 336a to the rotor shaft 310 in the radial direction of the rotor shaft 310 is constant in the embodiments of FIGS. 4 and 5, the rate of decrease ΔD12/ΔD11 may be a reducing rate as in the embodiments of FIGS. 6 and 7.

In this case, it is possible to further suppress the separation of the cooling fluid from the first redirecting surface 336a since the first redirecting surface 336a is formed in a streamlined shape.

Similarly, although a rate of increase ΔD22/ΔD21 in the distance D22 from the second redirecting surface 336b to the rotor shaft 310 in the radial direction of the rotor shaft 310 is constant in the embodiment of FIG. 5, the rate of increase ΔD22/ΔD21 may be a reducing rate as in the embodiments of FIGS. 6 and 7. In this case, it is possible to further suppress the separation of the cooling fluid from the second redirecting surface 336b since the second redirecting surface 336b is streamlined.

Meanwhile, in the embodiments of FIGS. 4 and 5, the first redirecting surface 336a and the second redirecting surface 336b are formed of a surface of the retaining ring 330A facing the fan 340 and a surface of the centering ring 330B facing the fan 340, respectively. That is, the first and second redirecting surfaces 336a and 336b are defined by the shapes of the retaining ring 330A and the centering ring 330B, but the present disclosure is not limited thereto. For example, as illustrated in FIGS. 6 and 7, the rotor coil protection ring 330 may further include a guide member 330C that is fastened to at least one of the retaining ring 330A and the centering ring 330B to be interposed between the retaining ring 330A and the fan 340 and between the centering ring 330B and the fan 340, and the first and second redirecting surfaces 336a and 336b may be formed of a surface of the guide member 330C facing the fan 340. That is, the first and second redirecting surfaces 336a and 336b are defined by the shape of the guide member 330C.

While the present disclosure has been described with respect to the specific embodiments, it will be apparent to those skilled in the art that various changes and modifications may be made without departing from the spirit and scope of the disclosure as defined in the following claims.

What is claimed is:

1. A rotor comprising:
   a rotor shaft;
   a rotor coil wound around the rotor shaft;
   a rotor coil protection ring surrounding the rotor coil at one end of the rotor shaft and being spaced apart from the rotor shaft to form a clearance space between the rotor coil protection ring and the rotor shaft; and
   a fan coupled to the rotor shaft opposite the rotor coil, interposing the rotor coil protection ring, to blow a cooling fluid toward the rotor coil, at least part of the blown cooling fluid flowing to the rotor coil being guided through the clearance space by surfaces of the rotor coil protection ring,
   wherein the surfaces of the rotor coil protection ring comprise:
   an inner peripheral surface facing the rotor shaft;
   an outer peripheral surface forming a back of the inner peripheral surface; and
   a tip surface extending between the inner and outer peripheral surfaces to face the fan and including a first redirecting surface that extends an entire length of the tip surface to redirect the flow of the blown cooling fluid to the clearance space, the first redirecting surface inclined with respect to an axial direction of the rotor shaft and inclined with respect to a radial direction of the rotor shaft.

2. The rotor according to claim 1, wherein the blown cooling fluid flows in the axial direction of the rotor shaft.

3. The rotor according to claim 1, wherein the first redirecting surface is formed such that a distance (D12) to the rotor shaft in the radial direction of the rotor shaft is decreased as a distance (D11) to the fan in the axial direction of the rotor shaft is increased.

4. The rotor according to claim 3, wherein the distance (D12) to the rotor shaft in the radial direction of the rotor shaft deceases at a constant rate.

5. The rotor according to claim 3, wherein the distance (D12) to the rotor shaft in the radial direction of the rotor shaft decreases at a reducing rate.

6. A rotor comprising:
   a rotor shaft;
   a rotor coil wound around the rotor shaft;
   a rotor coil protection ring surrounding the rotor coil at one end of the rotor shaft and being spaced apart from the rotor shaft to form a clearance space between the rotor coil protection ring and the rotor shaft; and
   a fan coupled to the rotor shaft opposite the rotor coil, interposing the rotor coil protection ring, to blow a cooling fluid toward the rotor coil, at least part of the blown cooling fluid flowing to the rotor coil being guided through the clearance space by surfaces of the rotor coil protection ring,
   wherein the surfaces of the rotor coil protection ring comprise:
   an inner peripheral surface facing the rotor shaft;
   an outer peripheral surface forming a back of the inner peripheral surface; and a tip surface extending between the inner and outer peripheral surfaces to face the fan and including a first redirecting surface for redirecting the flow of the blown cooling fluid to the clearance space, the first redirecting surface inclined with respect to an axial direction of the rotor shaft and inclined with respect to a radial direction of the rotor shaft, and wherein the surfaces of the rotor coil protection ring further comprise a second redirecting surface for redirecting the flow of the blown cooling fluid to the outer peripheral surface, the second redirecting surface inclined with respect to the axial direction of the rotor shaft and inclined with respect to the radial direction of the rotor shaft.

7. The rotor according to claim 6, wherein the blown cooling fluid flows in the axial direction of the rotor shaft.

8. The rotor according to claim 6, wherein the second redirecting surface is formed such that a distance (D22) to the rotor shaft in the radial direction of the rotor shaft is increased as a distance (D21) to the fan in the axial direction of the rotor shaft is increased.

9. The rotor according to claim 8, wherein the distance (D22) to the rotor shaft in the radial direction of the rotor shaft increases at a constant rate.

10. The rotor according to claim 8, wherein the distance (D22) to the rotor shaft in the radial direction of the rotor shaft increases at a reducing rate.

11. The rotor according to claim 6, wherein the rotor coil protection ring comprises:
a retaining ring positioned opposite the rotor shaft interposing the rotor coil, the retaining ring having a surface that faces the fan and includes the first redirecting surface; and
a centering ring positioned between the rotor coil and the fan, the centering ring protruding from the retaining ring toward the rotor shaft and having a surface that faces the fan and includes the second redirecting surface.

12. The rotor according to claim 6, wherein the rotor coil protection ring comprises:
a retaining ring positioned opposite the rotor shaft interposing the rotor coil;
a centering ring positioned between the rotor coil and the fan, the centering ring protruding from the retaining ring toward the rotor shaft; and
a guide member fastened to at least one of the retaining ring and the centering ring to be interposed between the retaining ring and the fan and between the centering ring and the fan, the guide member having a surface that faces the fan and includes the first and second redirecting surfaces.

13. A rotor comprising:
a rotor shaft;
a rotor coil wound around the rotor shaft;
a rotor coil protection ring surrounding the rotor coil at one end of the rotor shaft;
a fan coupled to the rotor shaft opposite the rotor coil, interposing the rotor coil protection ring, to blow a cooling fluid toward the rotor coil; and redirecting surfaces formed on the rotor coil protection ring so as to face the fan, at least a portion of the redirecting surfaces being formed such that a distance (D12) to the rotor shaft in a radial direction of the rotor shaft is decreased as a distance (D11) to the fan in an axial direction of the rotor shaft is increased.

14. The rotor according to claim 13, wherein the rotor coil protection ring comprises:
a retaining ring positioned opposite the rotor shaft interposing the rotor coil; and
a centering ring positioned between the rotor coil and the fan, the centering ring protruding from the retaining ring toward the rotor shaft and having a surface that faces the fan and is formed such that a distance (D12) to the rotor shaft in the radial direction of the rotor shaft is decreased as a distance (D11) to the fan in the axial direction of the rotor shaft is increased.

15. The rotor according to claim 14, wherein the retaining ring has a surface that faces the fan and is formed such that a distance (D12) to the rotor shaft in the radial direction of the rotor shaft is decreased as a distance (D11) to the fan in the axial direction of the rotor shaft is increased.

16. The rotor according to claim 14, wherein the retaining ring has a surface that faces the fan and is formed such that a distance (D22) to the rotor shaft in the radial direction of the rotor shaft is increased as a distance (D21) to the fan in the axial direction of the rotor shaft is increased.

17. The rotor according to claim 13, wherein the rotor coil protection ring comprises:
a retaining ring positioned opposite the rotor shaft interposing the rotor coil;
a centering ring positioned between the rotor coil and the fan, the centering ring protruding from the retaining ring toward the rotor shaft; and
a guide member fastened to at least one of the retaining ring and the centering ring to be interposed between the retaining ring and the fan and between the centering ring and the fan, the guide member having redirecting surfaces that face the fan and comprise an inner peripheral portion (336a) positioned inward in the radial direction of the rotor shaft and an outer peripheral portion (336b) positioned outward in the radial direction of the rotor shaft, and wherein the inner peripheral portion is formed such that a distance (D12) to the rotor shaft in the radial direction of the rotor shaft is decreased as a distance (D11) to the fan in the axial direction of the rotor shaft is increased, and the outer peripheral portion is formed such that a distance (D22) to the rotor shaft in the radial direction of the rotor shaft is increased as a distance (D21) to the fan in the axial direction of the rotor shaft is increased.

18. The rotor according to claim 6, wherein the guide member fastened to the at least one of the retaining ring and the centering ring is discretely formed with respect to each of the retaining ring and the centering ring.

* * * * *